United States Patent
Yamaji et al.

(10) Patent No.: US 9,639,753 B2
(45) Date of Patent: May 2, 2017

(54) IMAGE PROCESSING APPARATUS, IMAGE PROCESSING METHOD AND RECORDING MEDIUM

(71) Applicant: FUJIFILM Corporation, Tokyo (JP)

(72) Inventors: Kei Yamaji, Tokyo (JP); Daisuke Yamada, Tokyo (JP); Kazuma Tsukagoshi, Tokyo (JP); Yohei Momoki, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 115 days.

(21) Appl. No.: 14/494,715

(22) Filed: Sep. 24, 2014

(65) Prior Publication Data

US 2015/0086120 A1 Mar. 26, 2015

(30) Foreign Application Priority Data

Sep. 24, 2013 (JP) .................................. 2013-196568

(51) Int. Cl.
*G06K 9/00* (2006.01)
*G06T 11/60* (2006.01)

(52) U.S. Cl.
CPC .......... *G06K 9/00624* (2013.01); *G06T 11/60* (2013.01)

(58) Field of Classification Search
CPC ............... G06K 9/0063–9/00704; G06T 11/60
See application file for complete search history.

(56) References Cited

U.S. PATENT DOCUMENTS 8,548,249 B2 10/2013 Kashima et al.
2003/0016239 A1* 1/2003 Christopher ............ G06T 11/60
  715/712
2009/0116752 A1* 5/2009 Isomura ............ G06F 17/30265
  382/217
2009/0244096 A1* 10/2009 Yamaji ..................... G06T 11/00
  345/630
2011/0243453 A1* 10/2011 Kashima ........... G06F 17/30256
  382/195
2013/0086068 A1* 4/2013 Davids .............. G06F 17/30002
  707/737
2013/0111373 A1 5/2013 Kawanishi et al.
(Continued)

FOREIGN PATENT DOCUMENTS

JP 2011-170690 9/2011
WO 2013005266 1/2013

OTHER PUBLICATIONS

Japanese Office Action dated Sep. 29, 2015, with partial English Translation; Application No. 2013-196568.

*Primary Examiner* — Aaron W Carter
(74) *Attorney, Agent, or Firm* — Young & Thompson

(57) ABSTRACT

In an image processing apparatus, an image acquiring section acquires one or more images. An image analysis information acquiring section acquires image analysis information on each of the one or more images. A theme determining section determines a main theme representing a theme of each group of images related to each other among the one or more images and a subtheme representing a theme of each of the one or more images based on information on photography tendencies of images associated with each of one or more themes and the image analysis information on each of the one or more images. A theme information output section outputs information on the main theme and information on the subtheme.

18 Claims, 6 Drawing Sheets

(56) References Cited

U.S. PATENT DOCUMENTS

| | | | |
|---|---|---|---|
| 2013/0314749 A1* | 11/2013 | Boyd | G11B 27/031 358/1.18 |
| 2014/0009796 A1* | 1/2014 | Kajiwara | G06K 15/40 358/1.18 |
| 2014/0010444 A1* | 1/2014 | Sasaki | G06T 11/60 382/165 |
| 2014/0013213 A1* | 1/2014 | Kajiwara | G06F 17/212 715/243 |
| 2014/0086508 A1* | 3/2014 | Tang | G06K 9/00684 382/284 |
| 2015/0062652 A1* | 3/2015 | Kawai | G06K 15/1868 358/1.18 |
| 2015/0062653 A1* | 3/2015 | Kato | H04N 1/00442 358/1.18 |
| 2015/0063724 A1* | 3/2015 | Ikeda | G06F 17/30259 382/305 |
| 2015/0086116 A1* | 3/2015 | Yamaji | G06K 9/00684 382/190 |
| 2015/0131925 A1* | 5/2015 | Saito | G06T 11/60 382/284 |
| 2016/0034763 A1* | 2/2016 | Takanaka | G06K 9/00751 386/241 |
| 2016/0078322 A1* | 3/2016 | Yamaji | G06K 9/6267 382/224 |

* cited by examiner

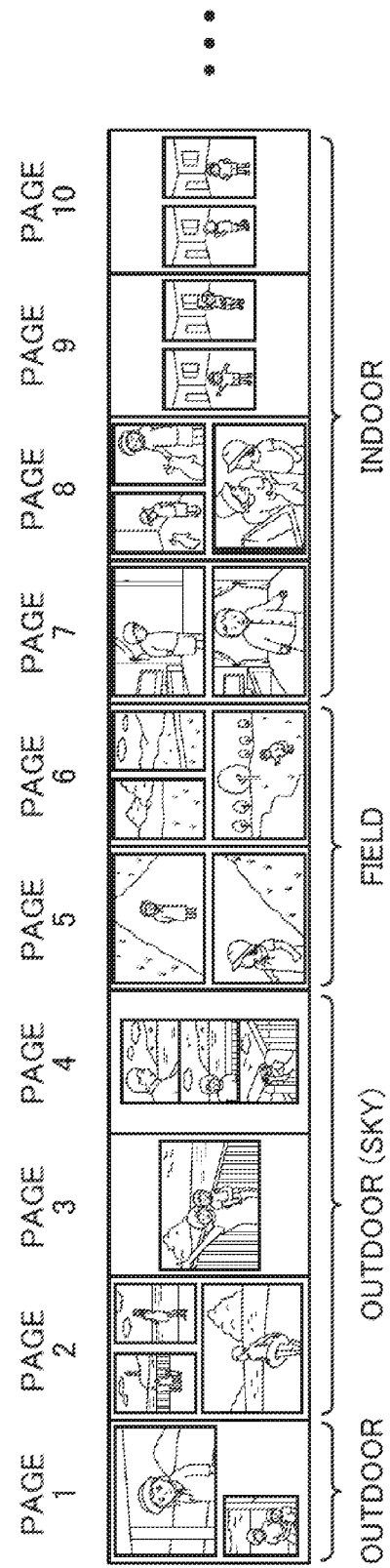

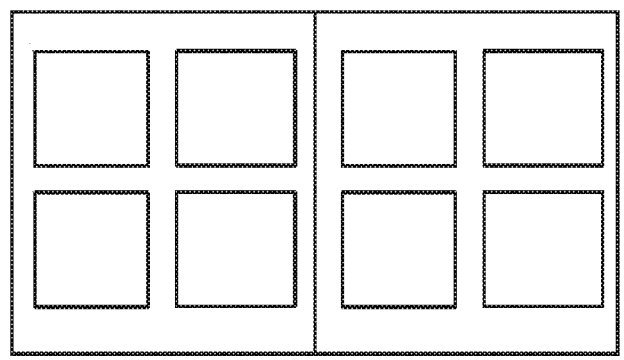
FIG. 5A
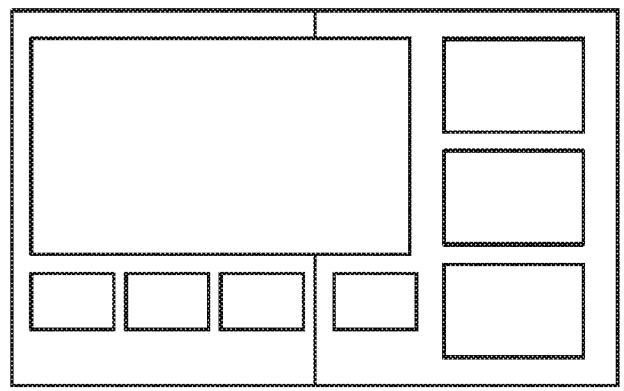
FIG. 5B
FIG. 6
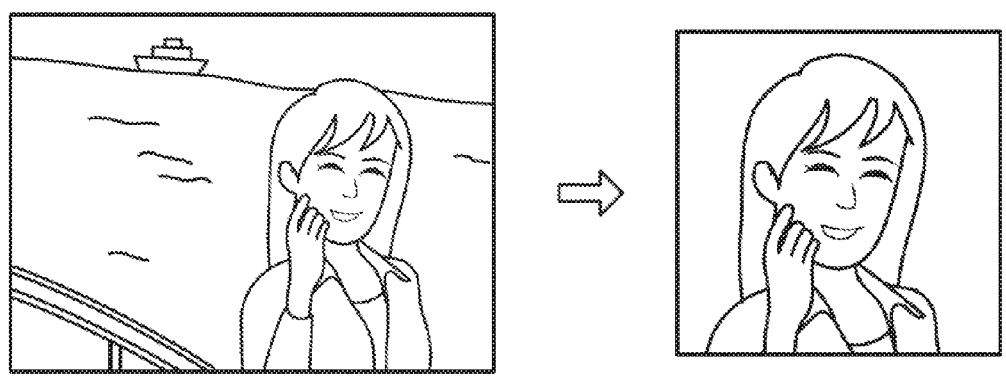

IMAGE PROCESSING APPARATUS, IMAGE PROCESSING METHOD AND RECORDING MEDIUM

CROSS-REFERENCE TO RELATED APPLICATIONS

The present application claims priority under 35 U.S.C. §119 to Japanese Patent Application No. 2013-196568, filed on Sep. 24, 2013. The above application is hereby expressly incorporated by reference, in its entirety, into the present application.

BACKGROUND OF THE INVENTION

The present invention relates to an image processing apparatus, an image processing method and a recording medium for distinguishing a group of images related to each other from a large number of images in order to use the group of images in image layout, decorations for the layout and the like in photo products such as photo books.

A photo book is a photo album that is created to have the layout desired by a user with a predetermined number of images selected by the user from among a plurality of images (image data) possessed by the user. Examples of photo products include, in addition to photo books, shuffle prints (in which a plurality of images are randomly arranged on a single mount), postcards and usual photo prints.

Conventionally, a photo book has been expected to be created from about several hundred images taken in one event such as a travel and a wedding. On the other hand, in recent years, by users each having a large number of images but not having time to create a photo book, a photo book is created as a memorial album from a large number of, i.e., 1000 to several thousands of images taken in a year, for instance.

However, there has been a problem in that it is extremely troublesome for a user to select images the user desires to put in a photo book from a large number of images and to think about the layout, i.e., how and which photo to arrange in each page of the photo book.

To cope with it, at present, an automatic layout function is realized in which, by specifying a photographing period of images and the number of pages of a photo book, a predetermined number of images having been specified with the photographing period are automatically selected from among a large number of images, and the layout of respective pages of the photo book which has been specified in terms of the number of pages is automatically created using the predetermined number of images as selected. Consequently, a user can easily produce a photo book from a large number of images without much trouble.

However, even when the automatic layout function is used, it is still difficult to, from a large number of images, collect images related to each other that have been taken in a single event such as a travel and a wedding and put a group of the related images in a single page of a photo book.

While the selection of images and the determination of layout have been automated as described above, in creation of a photo book, the design of decorations in the layout such as background sheets, frames and clip art is also an important factor for making the photo book more attractive.

Appropriate design of such decorations varies depending on the contents of a group of images arranged in the layout. For example, if decorations for a group of images of "wedding" are applied to a group of images of "child", this causes a feeling of strangeness. In addition, in the case where a photo book is created using a group of images of "child", appropriate decorations vary depending on whether it is a page having "images of snapshots of daily life" or a page having "images taken at the sea".

Thus, a sense of design is required in terms of, in addition to the layout of images, decorations in the layout in order to create an attractive photo book, but the function of automatically designing decorations for the layout has not yet been realized.

Now JP 2011-170690 A is given as prior art literature related to the present invention.

JP 2011-170690 A describes an information processing apparatus that creates a short movie from image data with the use of a template whose dramatizing method for the short movie has been decided, and that comprises an analysis section configured to extract image information from image data and analyze a theme of each image data group including a plurality of pieces of the image data on the basis of the extracted image information; and a selection section configured to automatically select a combination of a template stored in association with the theme and an image data group on the basis of the analyzed theme.

SUMMARY OF THE INVENTION

A first object of the invention is to overcome the above problems of the prior art and provide an image processing apparatus, an image processing method and a recording medium capable of distinguishing a group of images related to each other from among a large number of images.

A second object of the invention is to provide an image processing apparatus, an image processing method and a recording medium capable of automatically creating the layout so that a group of images related to each other are arranged together as well as decorating the layout.

In order to attain the object described above, the present invention provides an image processing apparatus, comprising:

an image acquiring section configured to acquire one or more images;

an image analysis information acquiring section configured to acquire image analysis information on each of the one or more images;

a theme information storage section configured to store information on photography tendencies of images in association with each of one or more themes;

a theme determining section configured to determine a main theme representing a theme of each group of images related to each other among the one or more images and a subtheme representing a theme of each of the one or more images based on the information on photography tendencies of images associated with each of the one or more themes and the image analysis information on each of the one or more images; and a theme information output section configured to output information on the main theme and information on the subtheme.

Also, the present invention provides an image processing method, comprising:

a step of acquiring one or more images by an image acquiring section;

a step of acquiring image analysis information on each of the one or more images by an image analysis information acquiring section;

a step of determining, by a theme determining section, a main theme representing a theme of each group of images related to each other among the one or more images and a subtheme representing a theme of each of the one or more images based on information on photography tendencies of images associated with each of one or more themes and the image analysis information on each of the one or more images; and a step of outputting information on the main theme and information on the subtheme by a theme information output section.

Also, the present invention provides a non-transitory computer readable recording medium having recorded thereon a program for causing a computer to execute each step of the image processing method according to described above.

In the present invention, it is possible to distinguish a group of images related to each other from among a large number of images by performing image analysis on each of one or more images to acquire image analysis information and determining the optimal theme of the group of images and the optimal theme of each image on the basis of the acquired image analysis information.

Consequently, according to the present invention, it is possible to automatically create the layout so that images of the same theme are arranged together and automatically apply decorations to the layout on the basis of the determined theme.

BRIEF DESCRIPTION OF THE DRAWINGS

FIG. 4 is a conceptual diagram showing an example of the layout created on the basis of a main theme and subthemes.

FIG. 5A is a conceptual diagram showing an example of the layout in which images of the same size are arranged, and FIG. 5B is a conceptual diagram showing an example of the layout in which an image larger than the other images is arranged.

FIG. 6 is a conceptual diagram showing an example of trimming whereby a part of image is clipped.

DETAILED DESCRIPTION OF THE INVENTION

An image processing apparatus, an image processing method and a recording medium of the present invention are described below in detail with reference to a preferred embodiment shown in the accompanying drawings.

Figure 1:
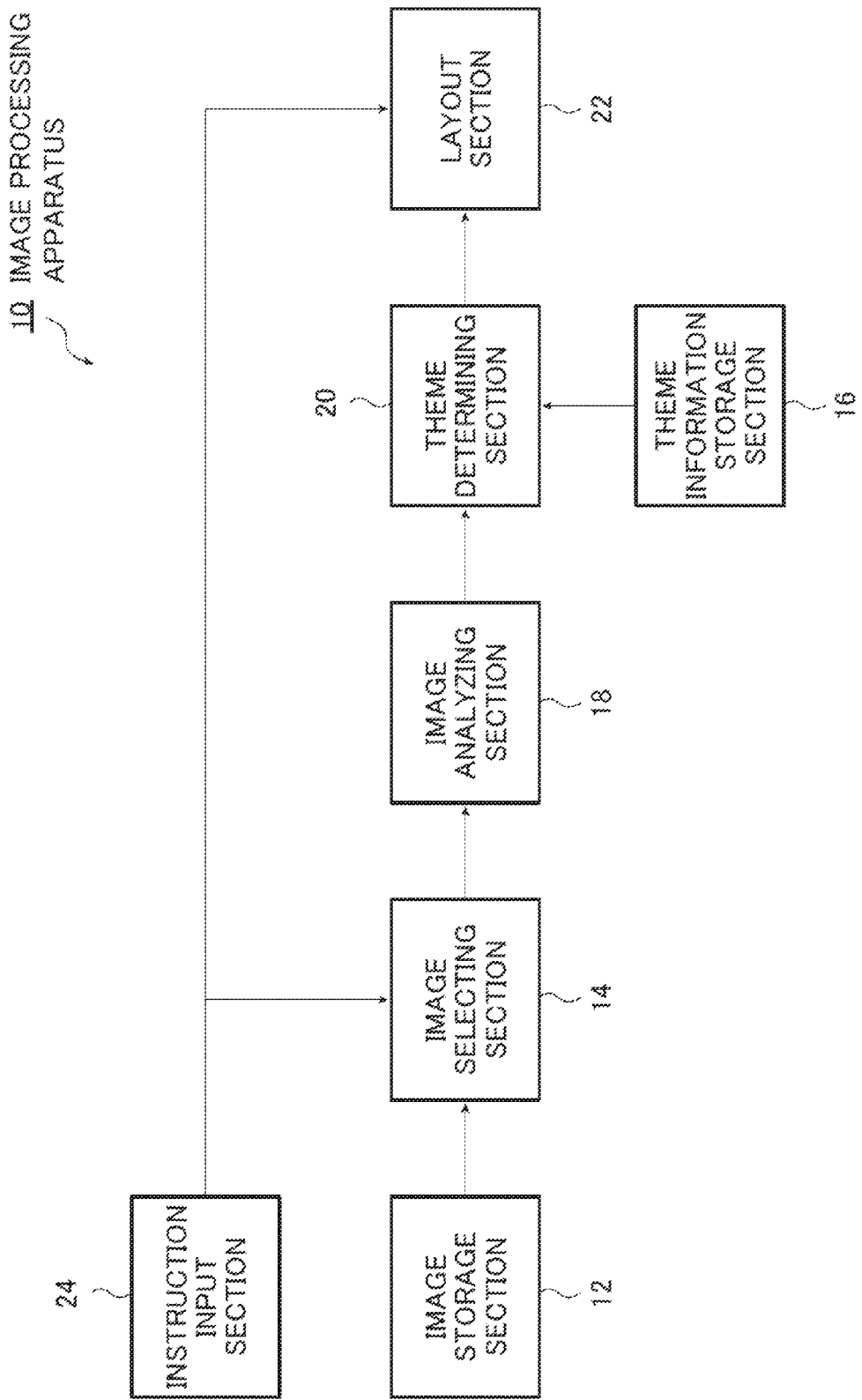
FIG. 1 is a block diagram showing the configuration of an embodiment of an image processing apparatus of the invention.

FIG. 1 is a block diagram showing the configuration of an embodiment of an image processing apparatus of the invention. An image processing apparatus 10 shown in the drawing is configured to distinguish a group of images related to each other from among a predetermined number of images, determine a corresponding theme of the distinguished group of images and that of each of the predetermined number of images, and create the layout of the predetermined number of images on the basis of the determined themes.

The image processing apparatus 10 includes an image storage section 12, an image selecting section 14, a theme information storage section 16, an image analyzing section 18, a theme determining section 20, a layout section 22 and an instruction input section 24.

The image storage section 12 is configured to store plural images possessed by a user.

The image selecting section 14 is configured to select a predetermined number of images (one or more images) from among the plural images stored in the image storage section 12.

For instance, when the instruction of specifying candidate images to be used in a photo book is entered through the instruction input section 24 to be described later, the image selecting section 14 selects a predetermined number of images that are to be the candidate images from among the plural images stored in the image storage section 12.

A method of selecting images by the image selecting section 14 is not limited, and images may be selected by, for example, specifying a photographing period of images, the number of images, a user or the like.

Instead of the above-described configuration in which the image processing apparatus 10 stores therein plural images and selects a predetermined number of images from among the stored plural images, the image processing apparatus 10 may be configured not to have the image storage section 12 and the image selecting section 14 but to have an image acquiring section that acquires a predetermined number of images entered from the exterior of the image processing apparatus 10.

Alternatively, similarly to the image selecting section 14, the image acquiring section may select a predetermined number of images from among a plurality of images entered from the exterior of the image processing apparatus 10 and acquire the selected images.

The theme information storage section 16 is configured to store, as theme information, information on photography tendencies of images in association with each of a predetermined number of themes (one or more themes).

The term "theme" used herein refers to a keyword representing the atmosphere or the impression of an image that a user receives upon viewing the image, and exemplary themes include a travel, a baby, a child, a wedding and a pet. The information on photography tendencies of images is information on conditions under which images of respective themes tend to be taken, and includes indoors or outdoors, the number of imaged person(s), the type of non-person image and a photographing period, for example.

In the theme information storage section 16, the information on photography tendencies of images is stored in advance. For instance, as shown in Table 1, information for the theme of "travel" is stored as follows: images tend to be taken outdoors; the number of imaged person(s) is often two to four; non-person images are mostly images of "landscapes"; and the photographing period is one to several days. The information on photography tendencies of images for the other themes of "baby", "child", "wedding", "pet" and the like is similarly stored. These are examples of themes under which many photo books are created in Japan.

TABLE 1

| Theme | Photography tendency |
|---|---|
| Travel | Images tend to be taken outdoors. |
|  | The number of imaged person(s) is often 2 to 4. |

TABLE 1-continued

| Theme | Photography tendency |
|---|---|
| | Non-person images are mostly images of "landscapes."<br>The photographing period is one to several days. |
| Baby | Images tend to be taken indoors.<br>The number of imaged person(s) is often 1 to 3, and images are often taken at close range.<br>(Images tend to be baby closeup images) |
| Child | Images tend to be taken outdoors.<br>Images often contain a large number of persons as taken in a nursery school or a kindergarten. |
| Wedding | Most images are taken indoors.<br>The number of imaged persons is large.<br>Non-person images are mostly images of "dishes" or "cakes".<br>The photographing period is several hours. |
| Pet | . . . |
| . . . | . . . |

The themes shown in Table 1 are one example. A theme may be divided into smaller segments, and for example, events such as "field day" as shown in Table 2, "birthday" as shown in Table 3, and the like can be set as themes in the theme information storage section 16.

TABLE 2

| Theme | Photography tendency | Supplementary note |
|---|---|---|
| Field day | The maximum number of faces is large. | Faces of children other than a user's child are often present in images of a field day. |
| | The average brightness is high. | A field day takes place outdoors. |
| | The variation in brightness is small. | A field day takes place outdoors (not many images taken indoors). |
| | There are many zoomed images. | A person to be imaged is zoomed in and imaged during a game as impossible to approach him/her. |

TABLE 3

| Theme | Photography tendency | Supplementary note |
|---|---|---|
| Birthday | The minimum brightness is low. | There is a scene of blowing out candles with the light off. |
| | The variation in brightness is large. | Images are taken with the light on/off. |
| | The photographing time range is short. | |
| | The size of a face is large. | The proportion of main guest closeup images is high. |

The theme information storage section 16 has stored therein a main theme that is a more generic theme and a subtheme under the main theme. As shown in FIG. 4, when a main theme is "travel", there are stored subthemes related to the "travel", such as "departure", "transportation", "outdoor", "field", "mountain", "sea", "sand beach", "indoor" and "dishes". This configuration also applies to other main themes. The information on photography tendencies of images for every subtheme is also stored in the theme information storage section 16.

TABLE 4

| Main theme | Subtheme |
|---|---|
| Travel | Departure, Transportation, Outdoor, Field, Mountain, Sea, Sand beach, Indoor, Dish, . . . |

TABLE 4-continued

| Main theme | Subtheme |
|---|---|
| Wedding | Bridal couple entrance, Ring exchange, Wedding cake cut, . . . |
| Baby | Delivery, Hospital, Shrine visit, Hand/Leg, Bathing, . . . |
| . . . | . . . |

The image analyzing section 18 is configured to perform image analysis on each of the predetermined number of images selected by the image selecting section 14 and determine image contents (an imaged person(s) (mainly a child, mainly a family, and the like), an imaged scene, an imaged object and the like), thereby acquiring image analysis information. The image analyzing section 18 can also utilize, in addition to image contents, photographing date information, photographing location information and the like stored as header information of an image as image analysis information.

The image analysis herein means analyzing the characteristics of a subject in an image, and use may be made of various analysis methods including conventionally known analysis methods. Examples of the image analysis include face detection/face recognition, age detection/sex detection, scene recognition (night view, sea, autumn color, sand beach, sky and the like) and object recognition (Golden Pavilion, Statue of Liberty, dishes, flower, cake and the like).

Instead of the above-described configuration in which the image processing apparatus 10 acquires image analysis information by therein performing image analysis on each of the predetermined number of images, the image processing apparatus 10 may be configured not to have the image analyzing section 18 but to have an image analysis information acquiring section that acquires image analysis information on each of the predetermined number of images by receiving the image analysis information entered from the exterior of the image processing apparatus 10. In this case, image analysis information only has to be linked with a corresponding image. Specifically, image analysis information may be accompanied with a corresponding image, or may be stored independently of a corresponding image.

Alternatively, the image analysis information acquiring section may perform image analysis on each of the predetermined number of images to produce image analysis information on each of the predetermined number of images and acquire the produced image analysis information, similarly to the image analyzing section 18.

The image analyzing section 18 is capable of acquiring image analysis information, for instance, as shown in Table 5 through image analysis. For example, as to an image (SDC0001.jpg), it can be seen from the results of image analysis (determination of image contents) that the imaged person is a child, the imaged scene is indoor, and the imaged object is none, and also can be seen as other information (header information of the image) that the photographing date is Jan. 31, 2013, the photographing location is at home which is measured by the global positioning system (GPS), and the like. Information on other images can be seen in the same manner.

TABLE 5

| Image | Analysis result | | | Other information | | ... |
|---|---|---|---|---|---|---|
| | Imaged person | Imaged scene | Imaged object | Shooting date | GPS | |
| SDC0001. jpg | Child | Indoor | None | 2013/1/31 | At home | |
| SDC0002. jpg | None | Indoor | None | 2013/2/1 | At home | |
| SDC0003. jpg | Father, Mother, Child | Indoor | None | 2013/2/1 | At home | |
| SDC0004. jpg | Child | Outdoor · Daytime | None | 2013/2/1 | At home | |
| SDC0005. jpg | Mother, Child | Night view | None | 2013/4/3 | N/A | |
| SDC0006. jpg | None | Night view | Ferris wheel | 2013/4/3 | N/A | |
| SDC0007. jpg | None | Night view | None | 2013/4/8 | N/A | |
| SDC0008. jpg | None | Sea | None | 2013/4/8 | N/A | |
| ... | | | | | | |
| Total | | | | | | |

The theme determining section 20 is configured to determine a main theme representing a theme of each group of images related to each other among the predetermined number of images selected by the image selecting section 14 and a subtheme representing a theme of each of the predetermined number of images on the basis of the information on photography tendencies of images associated with each of the predetermined number of themes as stored in the theme information storage section 16 and the image analysis information on each of the predetermined number of images.

The theme determining section 20 of this embodiment includes a main theme determining section that determines a main theme on the basis of the information on photography tendencies of images associated with each of the predetermined number of themes and all pieces of the image analysis information on respective images of a group of images; and a subtheme determining section that determines a subtheme on the basis of the determined main theme, the information on photography tendencies of images associated with each of the predetermined number of themes and the image analysis information on each image of the group of images corresponding to the main theme.

The layout section 22 is configured to, on the basis of at least either the main theme or the subtheme as determined by the theme determining section 20, create the layout with the predetermined number of images selected by the image selecting section 14 so that images of the same theme are arranged together.

In the case of a photo book for instance, the layout section 22 creates the layout with the predetermined number of images on the basis of at least either a main theme or a subtheme so that images of the same theme are arranged together in a single page.

Instead of the above-described configuration in which the image processing apparatus 10 therein creates the layout with the predetermined number of images, the image processing apparatus 10 may be configured not to have the layout section 22 but to have a theme information output section that outputs (e.g., displays or transmits) information on a main theme and a subtheme as determined by the theme determining section 20 to the exterior of the image processing apparatus 10. In this case, the layout section 22 creates the layout with the predetermined number of images on the basis of the theme information output to the exterior of the image processing apparatus 10, i.e., at least either the main theme or the subtheme.

Finally, the instruction input section 24 is used by a user to input various instructions such as the instruction of specifying candidate images to be used in a photo book from among the plural images stored in the image storage section 12 and the instruction of editing the layout created by the layout section 22.

Figure 2:
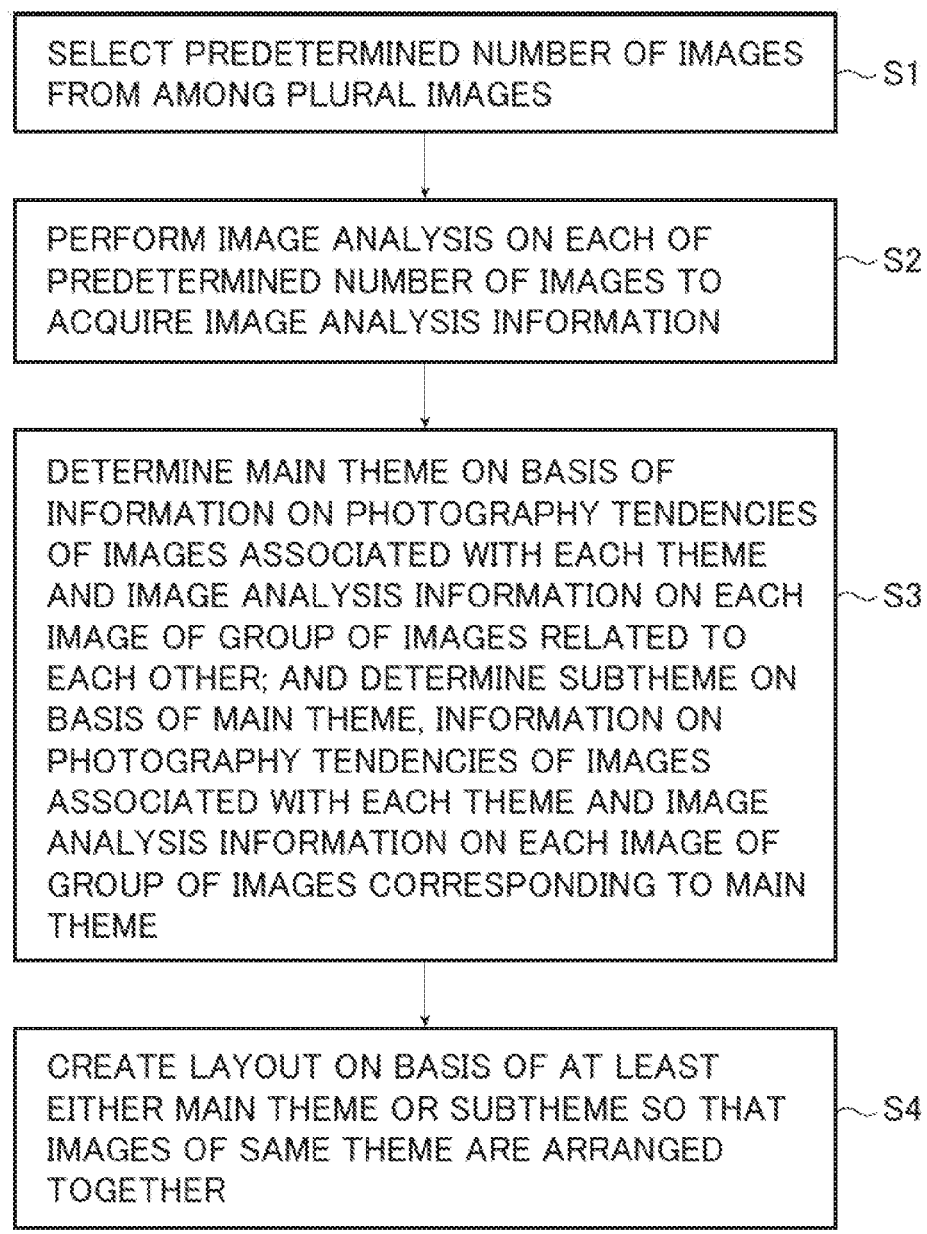
FIG. 2 is a flowchart of an example of the operation of the image processing apparatus shown in FIG. 1.

Next, the operation of the image processing apparatus 10 according to the image processing method of the invention is described with reference to the flowchart shown in FIG. 2. The following explanation is made for the case where the present invention is applied to a photo book.

When the instruction of specifying candidate images for use in a photo book is entered through the instruction input section 24, the image selecting section 14 selects a predetermined number of images that are to be the candidate images from among plural images stored in the image storage section 12 (Step S1).

Upon selection of the predetermined number of images, the image analyzing section 18 performs image analysis on each of the predetermined number of images to acquire image analysis information (Step S2).

Subsequently, the theme determining section 20 determines a main theme on the basis of the information on photography tendencies of images associated with each of a predetermined number of themes as stored in the theme information storage section 16 and all pieces of the image analysis information on respective images of a group of images, and determines a subtheme on the basis of the determined main theme, the information on photography tendencies of images associated with each of the predetermined number of themes and the image analysis information on each image of the group of images corresponding to the main theme (Step S3).

Figure 3:
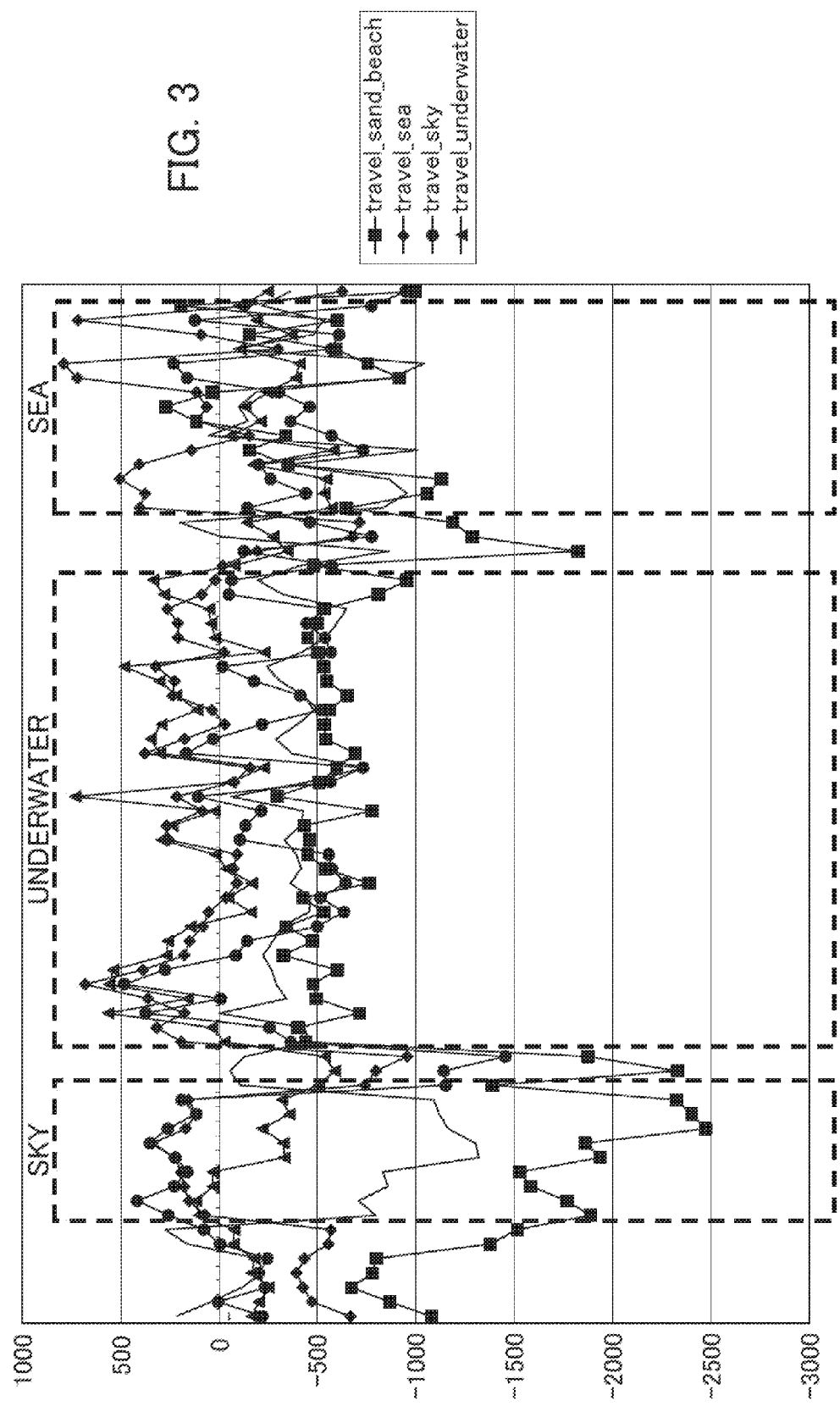
FIG. 3 is a conceptual diagram showing an example of scores of respective keywords corresponding to themes, which scores are given to each of a predetermined number of images.

FIG. 3 is a conceptual diagram showing an example of scores of respective keywords corresponding to themes, which scores are given to each of a predetermined number of images. The horizontal axis in the drawing represents the predetermined number of images while the vertical axis represents scores of keywords. In the drawing, scores of the keywords of "travel_sand beach", "travel_sea", "travel_sky" and "travel_underwater" given to the predetermined number of images are plotted, and the plotted points of scores of each keyword are connected like a line graph.

For example, on the basis of the image analysis information, the theme determining section 20 gives each of the predetermined number of images scores of the respective keywords according to the information on photography tendencies of images, as shown in FIG. 3. For instance, when an image shows the sea, the theme determining section 20 gives the image a score of "sea" according to the area of the imaged sea, more specifically, gives a higher score of "sea" as the area of the imaged sea increases. This configuration also applies to other keywords.

Then, the theme determining section 20 (main theme determining section) distinguishes a group of images related to each other from among the predetermined number of images on the basis of scores of the respective keywords given to each of the predetermined number of images, and determines a main theme on the basis of all the scores of the respective keywords given to images of the distinguished group of images. Many images in the group of images on the right in FIG. 3 have high scores with respect to the keyword of "travel_sea" and consequently, the main theme of this group of images is determined to be "travel_sea". This configuration also applies to other groups of images.

However, even if a group of images consists of images of a single scene, the images are not necessarily determined to have the identical theme. For instance, as shown in FIG. 3, the group of images whose main theme is determined to be "sea" contains images of "sea" and images of "sand beach" together. The theme determining section 20 may obtain the total score of each keyword and determine a theme corresponding to the keyword having the highest total score as the main theme of the group of images, for example.

The predetermined number of images also contain unrelated images. Such unrelated images are determined to be images not having any important scene and, for instance, are not used in the layout of a photo book.

Subsequently, the theme determining section 20 (subtheme determining section) determines a subtheme on the basis of the determined main theme and scores of the respective keywords given to each image of the group of images corresponding to the determined main theme. For example, the theme determining section 20 (subtheme determining section) may determine a theme corresponding to the keyword having the highest score among scores of the respective keywords given to each of the predetermined number of images as a subtheme of each of the predetermined number of images.

Then, the layout section 22 creates the layout with the predetermined number of images on the basis of at least either the main theme or the subtheme as determined by the theme determining section 20 so that images of the same theme are arranged together in a single page of a photo book (Step S4).

For example, the layout section 22 may divide the predetermined number of images into a predetermined number of groups on the basis of at least either main themes or subthemes, select a specified number of images from each of the predetermined number of groups, and create the layout in each page of a photo book with the specified number of images.

FIG. 4 is a conceptual diagram showing an example of the layout created on the basis of a main theme and subthemes. The drawing shows layouts of pages of a photo book whose main theme has been determined as "travel" by a group of images related to each other, the layouts being based on the subthemes of "outdoor", "outdoor (background: sky)", "field", "indoor" and the like under the main theme. The images of "outdoor" are placed in the first page; the images of "outdoor (background: sky)" in the second to fourth pages; the images of "field" in the fifth and sixth pages; and the images of "indoor" in the seventh to tenth pages. Thus, images of the same subtheme can be arranged in a single page or consecutive pages on the basis of themes.

The image processing apparatus 10 acquires image analysis information on each of the predetermined number of images by performing image analysis and on the basis of the acquired image analysis information, distinguishes a group of images related to each other and determines the optimal theme of each image. Owing to this configuration, the image processing apparatus 10 can distinguish a group of images related to each other from among a large number of images. Therefore, for instance, the image processing apparatus 10 can create the layout on the basis of determined themes so that images of the same theme are arranged together.

While a subtheme is determined after determination of a main theme in the foregoing embodiment, the invention is not limited thereto, and it is also possible to determine a main theme after determination of a subtheme.

In this case, the theme determining section 20 includes a subtheme determining section that determines a subtheme on the basis of the information on photography tendencies of images associated with each of the predetermined number of themes and the image analysis information on each image of the predetermined number of images; and a main theme determining section that determines a main theme on the basis of the information on photography tendencies of images associated with each of the predetermined number of themes and the subtheme of each image of a group of images.

For example, the theme determining section 20 may determine as to which main theme a subtheme of each image of a group of images belongs to on the basis of the information on photography tendencies of images associated with each of the predetermined number of themes, and determine a main theme to which the largest number of subthemes belong as the main theme of the group of images.

In the case where a user inputs an instruction on editing of the layout through the instruction input section 24 after the layout is automatically created by the layout section 22, the theme determining section 20 may determine at least either a main theme of a group of images corresponding to the edited layout or a subtheme of each image of the group of images corresponding to the edited layout based on the user's instruction on editing of the layout. Thus, it is possible to automatically adjust (correct) the main theme of the group of images and the subtheme of each image of the group of images in accordance with the edited layout.

When images in edited layout all have the same size as shown in FIG. 5A, the theme determining section 20 determines the main theme on the basis of all pieces of the image analysis information on respective images in the edited layout. In this case, the theme determining section 20 determines the main theme by evenly taking account of the image analysis information on each image in the edited layout, for example.

As shown in FIG. 5B, when an image larger in size than the other images in the edited layout is changed, the theme determining section 20 changes the main theme on the basis of the image analysis information on the image larger in size than the other images. For example, when the image larger in size than the other images is an image of "sea", even if the other images are all images of "indoor", the theme determining section 20 determines the main theme of the group of images corresponding to the edited layout as "sea".

This example includes cases where one image in the layout created by the layout section 22 is enlarged to have a larger size and where an image having a larger size in the layout created by the layout section 22 is replaced by another image.

When a part of an image is clipped through trimming as shown in FIG. 6, on the basis of image analysis information on the clipped image after trimming, the theme determining section 20 determines a subtheme of the image.

The layout section 22 can automatically apply decorations such as background sheets, frames, clip art and the like to the layout on the basis of at least either a main theme or a subtheme.

Figure 7:
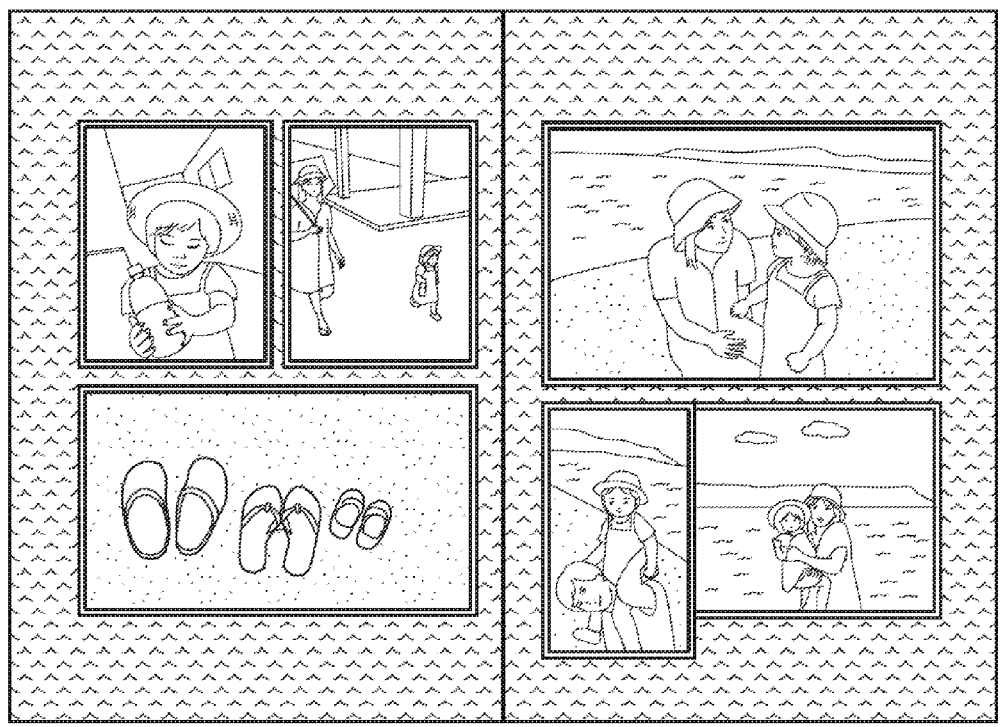
FIG. 7 is a conceptual diagram showing an example of the layout of a photo book to which decorations are applied in accordance with a theme.

FIG. 7 is a conceptual diagram showing an example of the layout of a photo book to which decorations are applied in accordance with a theme. The drawing shows the case where six images whose subthemes are "sea" are arranged on facing pages in a photo book, and a background image giving the impression of "sea" is caused to appear on a background sheet. Similarly, a frame and a clip art image as well as the type, size, color and the like of font of comments to be input may be determined in accordance with a theme.

Alternatively, the theme determining section 20 may be configured to determine a main theme only when at least either photographing dates or photographing locations (which are determined using information on photographing locations measured by the GPS) of images of a group of images fall within a predetermined range set in advance.

For instance, when photographing dates of images of a group of images are close to each other (e.g., in the case of the same photographing date) or when photographing locations thereof are close to each other, the theme determining section 20 determines the group as a group of images related to each other and then determines a main theme of the group of images. In contrast, when images of a group of images are different from each other in photographing date or photographing location, the theme determining section 20 determines that it is difficult to fix a main theme of the group of images, and therefore a main theme is not determined.

While in the foregoing embodiment, the described example is a case where the layout section 22 creates the layout of each page of a photo book so that images of the same theme are arranged in the same page or consecutive pages, the invention is not limited thereto and is applicable to cases where the layout of shuffle print or a postcard is created so that images of the same theme are arranged on a single mount, in other words, applicable to a variety of photo products using images.

The method of the present invention can be carried out by, for instance, a program that causes a computer to implement steps of the method. Alternatively, a computer readable recording medium having the program stored therein may also be provided.

This invention is basically as described above.

While the present invention has been described above in detail, the invention is not limited to the above embodiment, and various improvements and modifications may be made without departing from the spirit and scope of the invention.

What is claimed is:

1. An image processing apparatus, comprising:
an image acquiring section implemented by a programmed computer device and configured to acquire one or more images;
an image analysis information acquiring section, implemented by the programmed computer device and configured to acquire image analysis information on each of the one or more images;
a theme information storage section implemented by the programmed computer device and configured to store information on photography tendencies of images in association with each of one or more themes;
a theme determining section implemented by the programmed computer device and configured to determine a main theme representing a theme of each group of images related to each other among the one or more images and a subtheme representing a theme of each of the one or more images based on the information on photography tendencies of images associated with each of the one or more themes and the image analysis information on each of the one or more images; and
a theme information output section implemented by the programmed computer device and configured to output information on the main theme and information on the subtheme,
wherein the theme determining section comprises:
a subtheme determining section configured to determine the subtheme based on the information on photography tendencies of images associated with each of the one or more themes and the image analysis information on each image of the one or more images; and
a main theme determining section configured to determine as to which main theme a subtheme of each image of the group of images belongs to, based on the information on photography tendencies of images associated with each of the one or more themes and the subtheme of each image of the group of images, and determine a main theme to which a largest number of subthemes belong as the main theme of the group of images.

2. The image processing apparatus according to claim 1, wherein the image acquiring section is configured to acquire the one or more images by selecting the one or more images from among a plurality of images.

3. The image processing apparatus according to claim 1, wherein the image analysis information acquiring section is configured to acquire the image analysis information on each of the one or more images by performing image analysis on each of the one or more images.

4. An image processing method, comprising:
a step of acquiring one or more images by an image acquiring section;
a step of acquiring image analysis information on each of the one or more images by an image analysis information acquiring section;
a step of determining, by a theme determining section, a main theme representing a theme of each group of images related to each other among the one or more images and a subtheme representing a theme of each of the one or more images based on information on photography tendencies of images associated with each of one or more themes and the image analysis information on each of the one or more images; and
a step of outputting information on the main theme and information on the subtheme by a theme information output section,
wherein the step of determining the main theme and the subtheme includes:
a step of determining, by a subtheme determining section, the subtheme based on the information on photography tendencies of images associated with each of the one or more themes and the image analysis information on each image of the one or more images; and
a step of determining, by a main theme determining section, as to which main theme a subtheme of each image of the group of images belongs to, based on the information on photography tendencies of images associated with each of the one or more themes and the subtheme of each image of the group of images, and determining a main theme to which a largest number of subthemes belong as the main theme of the group of images.

5. The image processing method according to claim 4, wherein the image acquiring section acquires the one or more images by selecting the one or more images from among a plurality of images.

6. The image processing method according to claim 4, wherein the image analysis information acquiring section acquires the image analysis information on each of the one or more images by performing image analysis on each of the one or more images.

7. A non-transitory computer readable recording medium having recorded thereon a program for causing a computer to execute each step of the image processing method according to claim 4.

8. The image processing apparatus according to claim 1, comprising:
a layout section implemented by the programed computer and configured to create a layout with the one or more images based on at least either the main theme or the subtheme such that images of a same theme are arranged together.

9. The image processing apparatus according to claim 8, comprising:
an instruction input section configured to be used to input various instructions,
wherein in cases where an instruction on editing of the layout is input through the instruction input section after the layout is created by the layout section, the theme determining section is configured to determine at least either a main theme of a group of images corresponding to an edited layout or a subtheme of an image of the group of images corresponding to the edited layout based on the instruction on editing of the layout.

10. The image processing apparatus according to claim 9, wherein when images in the layout all have a same size, the theme determining section is configured to determine the main theme based on all pieces of the image analysis information on respective images in the layout.

11. The image processing apparatus according to claim 9, wherein when an image larger in size than other images in the layout is changed, the theme determining section is configured to determine the main theme based on image analysis information on the image larger in size than the other images.

12. The image processing apparatus according to claim 9, wherein when a part of an image is clipped through trimming, the theme determining section is configured to determine the subtheme based on image analysis information on the clipped image after trimming.

13. The image processing apparatus according to claim 8, wherein the layout section is configured to apply decorations to the layout based on at least either the main theme or the subtheme.

14. The image processing apparatus according to claim 8, wherein the layout section is configured to create a layout of each page of a photo book such that images of a same theme are arranged in a same page.

15. The image processing apparatus according to claim 8, wherein the layout section is configured to create a layout of a postcard such that images of a same theme are arranged on a single mount.

16. The image processing method according to claim 4, comprising:
a step of creating a layout with the one or more images by a layout section based on at least either the main theme or the subtheme such that images of a same theme are arranged together.

17. The image processing method according to claim 16, wherein in cases where an instruction on editing of the layout is input through an instruction input section after the layout is created by the layout section, the theme determining section determines a main theme of a group of images corresponding to an edited layout based on the instruction on editing of the layout.

18. The image processing method according to claim 16, wherein the layout section applies decorations to the layout based on at least either the main theme or the subtheme.

* * * * *